Patented Aug. 8, 1939

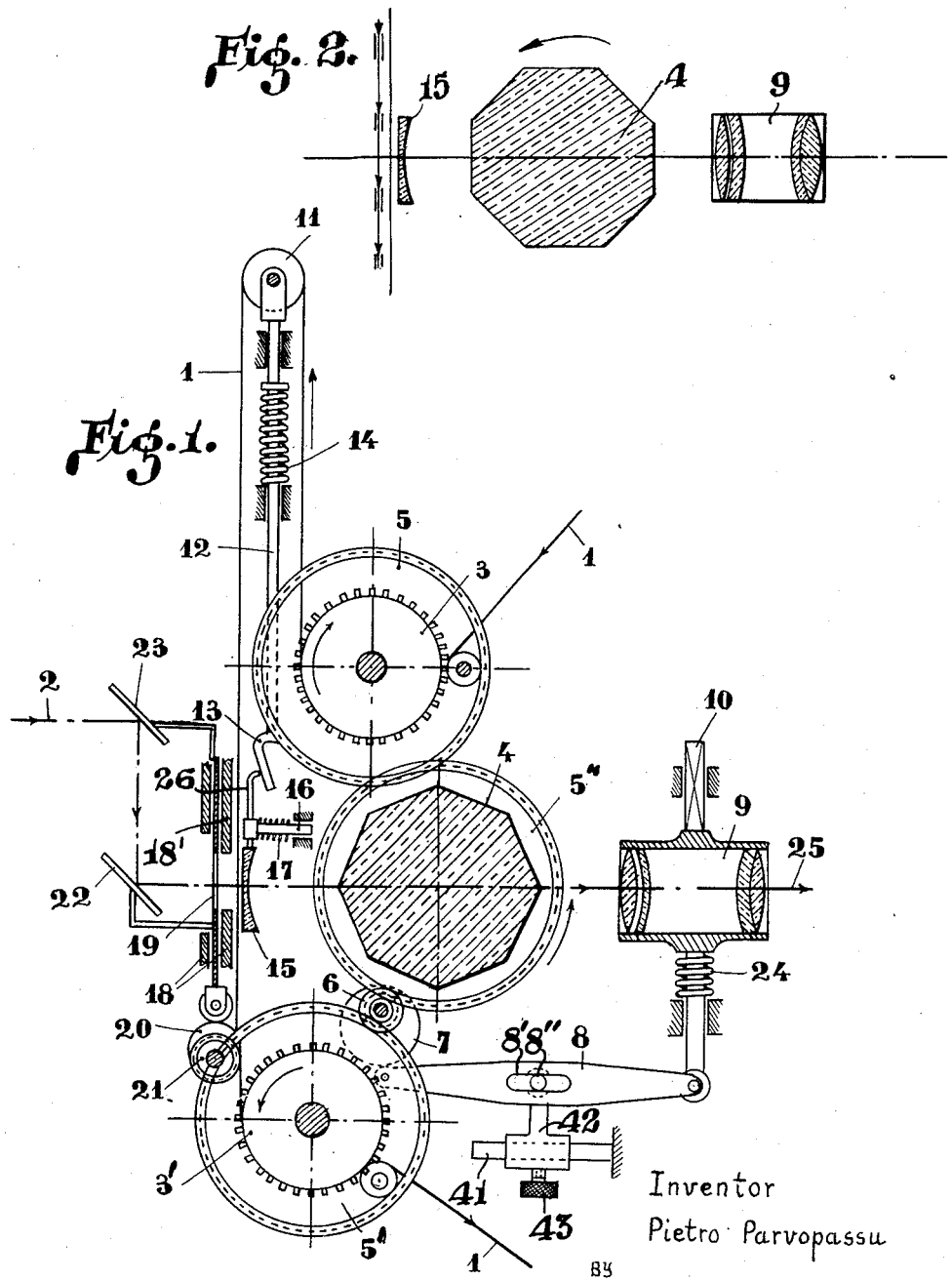

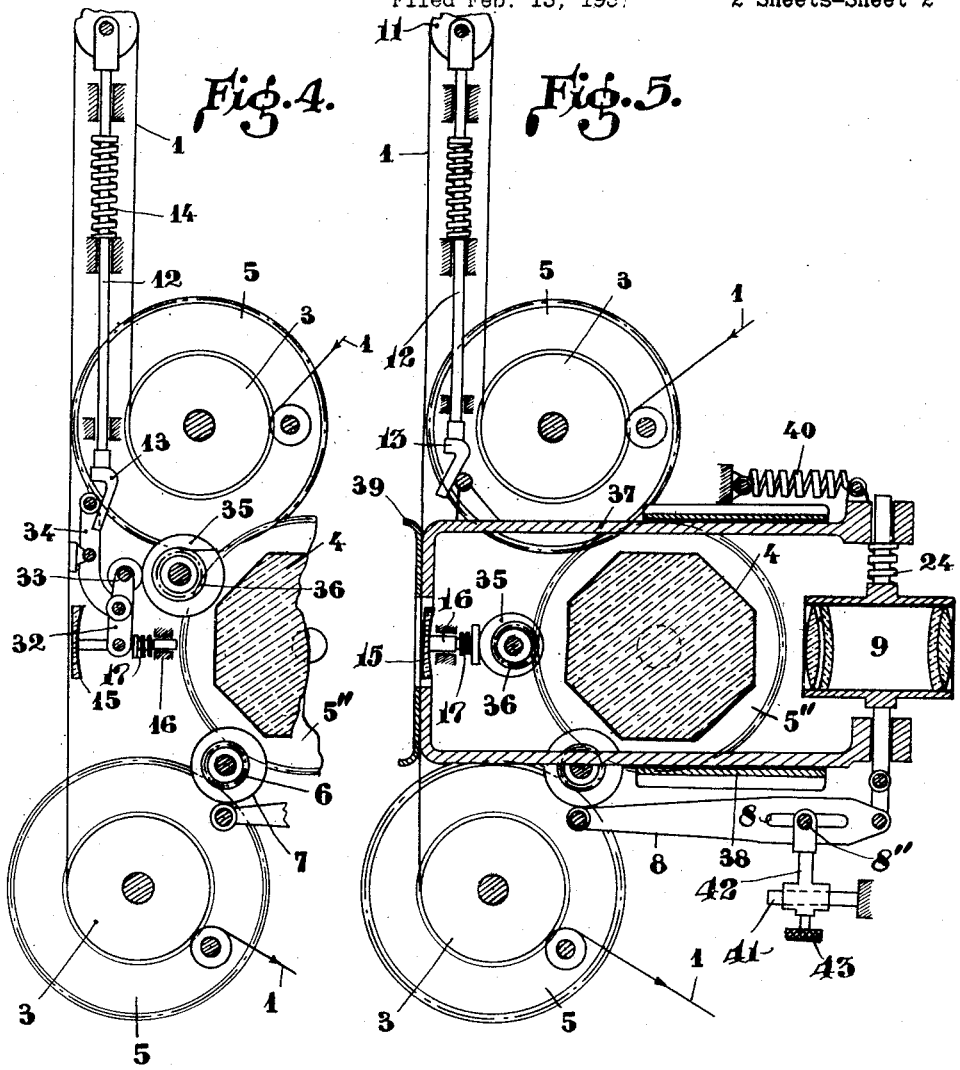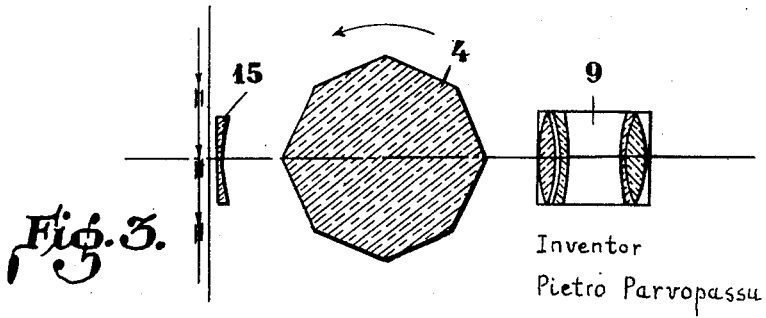

2,168,433

UNITED STATES PATENT OFFICE 2,168,433

CINEMATOGRAPHICAL PROJECTING APPARATUS WITH OPTICAL COMPENSATION

Pietro Parvopassu, Rome, Italy

Application February 13, 1937, Serial No. 125,602
In Italy February 17, 1936

5 Claims. (Cl. 88—16.8)

The inconveniences of the usual projectors with discontinuous movement are well known, in fact they produce sparking in the projection and the rapid aging of the film. It is also known that in order to eliminate these inconveniences, other types of cinematographical projecting devices known as "projecting apparatus with optical compensation" have been proposed and used, in which the film is moved continually with a uniform speed; the effects of the movement of the film being neutralized on the screen by an optical device adapted to stop successively the projected images, so that these mesh into one another without dark intervals.

The optical compensating devices used up to now consist generally of a plurality of mirrors, lenses or prisms provided with various movements; their construction being complicated and costly.

The object of the present invention is to provide a cinematographical projecting apparatus, embodying the advantage of the systems with optical compensation, without the inconveniences now resulting from these projecting apparatus.

In the projecting apparatus according to the present invention, the action of a rotating compensating prism of any known type is associated to a number of other devices adapted to correct and improve the resulting effects, said additional devices being the following; corrector, stabilizator, shutter, and economiser, these names indicating clearly their respective action and object, and which are fully described hereinafter.

In this optical system of compensation, the rotating prism is a glass prism, having a regular polygonal base of $2n$ sides, which is caused to rotate round its axis, interposed between the objective lens and the film moving with uniform movement, the axis of the prism being disposed normally with respect to the edges of the film, the ratio of the speed of rotation of the prism with respect to the linear velocity of the film being $$\frac{1}{2n}$$

turns of the prism for each "period", i. e. for each photogram projected.

The optical compensation given by the rotating prism, without additional devices, is sufficiently perfect for practical purposes, only for limited angles of incidence of the light rays on the prism. By projecting the image only for the fraction of period in which said incidence is less than a certain limit, and by obscuring the screen for the remainder of the period, it is possible to use the rotating prism device in all its simplicity. The duration of the obscuration is as much more reduced as the number $2n$ of the faces of the prism is larger, and it may be reduced even to nought when $2n$ is very large. However in this case the prism would be very large and its construction would be difficult, and consequently bulky and costly.

For small and economical prisms, the periodical concealment of the image would have such a duration as to cause the reappearance of one of the drawbacks met with in intermittent projections, consisting in the sensation of sparking experienced by the spectator, and to lower substantially the luminous efficiency. A projecting apparatus provided with a simple rotating prism would be mechanically and optically very simple; it would have the advantage, in comparison with the apparatus for intermittent projection, of the long life of the film, but would have the disadvantage of a low luminous efficiency and of a sparking projection if not provided with a prism having a very large number of faces.

This device, hereinafter named "stabilizer" is adapted to compensate, by means of small oscillations of the objective, the discrepancies which occur, owing to considerable incidences of the light rays, between the real displacement of the film and the apparent displacement caused by the compensating prism when this rotates, as required, through angles which are proportional to the spaces run over by the photogram.

The "correcting" device has the object of neutralising the small variability of the height of the photograms which occurs from one film to another, and to cause the prism, which has fixed dimensions, which are consequently adapted to photograms whose height is well determined, to operate always in the conditions necessary for obtaining a perfect compensation, whatever be the variation of the height of the photogram during the projection.

Said correcting device comprises a cylindrical lens, movable along the optical axis of the projector, placed at a small distance from the film, and on the side of the objective, the movement of said lens being controlled by a roller which, under the action of a contracting spring, pulls a loop of film comprising a given number of photograms, and which, when the heights of these photograms vary, thus varying the length of the loop, displaces itself so as to measure the height of the photograms.

The movable compensating lens above mentioned, in addition to its action adapted to maintain constant the height of the photogram, as viewed from the objective, when the height of the photogram varies, has also the function of assuring the absolute fixity of the projected image.

In fact, when compensating prisms having a limited number of faces are used, operating with considerable incidences, the image of the photogram viewed from the objective, is subjected, to deformation. More precisely, said image, for incidence nought (or when the prism has its active faces normal to the optical axis of the projector, and the photogram is centered) is geometrically similar to that of the photogram; for different incidences increasing from nought, the elongation occurs in a vertical direction, viz, in the direction perpendicular to the edges of the prism and parallel to the edges of the film. The apparent elongation of the photogram depends from the angle of incidence and from the size of the prism, and increases with the increase of these quantities; said elongation has its maximum value in correspondance with the maximum incidence, that is to say when the prism has two opposite edges on the optical axis of the projector and the photogram is out of centre to the amount of one half of its height, corresponding to the exchange phase, in which the projection of a photogram ceases, and that of the following photogram commences.

By projecting an image having a periodically variable height, it would evidently not be possible to cause its fixity on the screen; there would occur in any case a trembling movement in the higher and lower zones of the projection.

It is however possible to neutralize this aberration by periodically varying, with a law similar to that of the height variation of the image, the distance of the correcting lens of the film.

It is sufficient for this purpose to use a device adapted to confer to the compensating lens two simultaneous movements; the first slow and accidental, corresponding to the variations of the height of the photograms the second movement which is rapid and periodical (one oscillation for each photogram) corresponding to the rapid and periodical variations in the height of the image viewed from the objective, as a consequence of the variation of the incidence of the light rays on the faces of the prism in rotation.

With the devices described above, the projection of each photogram is correctly accomplished, from the moment in which it touches with its lower edge the optical axis of the objective, to the moment in which it touches this latter with its upper edge; beyond these limits it is convenient to obscure the photogram, this being obtained by providing the projector with any known type of shutter. In order to improve the luminous efficiency of the projector, a movable mirror device is used, hereinafter referred to as "economiser". Without the use of this economiser, the luminous efficiency of a continuous film running projector with optical compensation is about the same to that of a common projector with discontinuous traction. In this latter the area illuminated corresponds to the size of a single photogram, while the shutter obscures temporarily the screen, so that the loss of light is about 50%. In the projector in which the film runs continuously, there is no obscuration of the screen, but on the other hand, with equal intensity of the source of light, there is a smaller luminous intensity of the film, due to the fact that it is necessary to illuminate an area which is nearly double that of a photogram, and which corresponds to the whole area covered by the photogram in movement during its projection.

By using, however, the economiser according to the invention, the light from the light source may be directed and concentrated on the area of the single photogram being projected.

The appended drawings serve to illustrate both the particulars and the assembly forming the projector, and the principles on which its working is based.

Fig. 1 shows, in a first particular form of construction, the assembly of the various devices forming together, the projector, viz; the rotating prism mounted in conjunction with the stabilizer, whose action is limited to the correction of the accidental variations of the real height of the photograms, the corrector, the shutter and the economiser.

Figs. 2 and 3 show the optical chain of the projector in two different positions of the projection; and Figs. 4 and 5 show two alternative forms of the corrector in its complete form, in which the distance between the correcting lens is caused to be varied with a double control.

The different members, forming in their assembly the projector in its preferred form will be hereinafter described successively, the different forms of realization being shown on the drawings.

The rotating compensating prism, is adapted to operate the main compensation of the movement of the film, and consists in a glass prism the height of which corresponds to the width of the film, and has a polygonal base comprising $2n$ sides.

In the figures, the prism is shown by way of example, as having eight sides. The prism is interposed between the film and the objective, and owing to its mechanical connections with the unwinding drums of the film, it rotates one complete turn for every $2n$ photograms traversing the optical axis of the objective.

Said prism may be considered as the resultant of $n$ plane parallel plates; and when a beam of parallel light rays strikes on a face, emerging from the opposite face, it will, emerge as it is well known from elementary optics, parallel to itself but displaced through a certain amount depending from the refraction index of the glass, upon the angle of incidence of the light beam (no displacement for normal incidence as shown in Fig. 2), and upon the size of the double apothem of the base of the prism (thickness of the plate considered).

The double apothem is thus dimensioned so that two incident rays, parallel to the line connecting two opposite vertexes of the base, emerge superposed to each other, said rays being each spaced by an amount $h_t:2$, from said connecting line, and consequently by the distance $h_t$ one from the other, $h_t$ indicating the height of a photogram on the film.

In Figure 1, I shows the film, 2 the axis of the light beam coming from the left hand side, issuing from a light source (not shown). The beam is reflected twice at right angles by reflecting itself on the economizing mirrors 22 and 23, and then, following the course of the optical axis of the projector, passes through the film I, the correcting lens 15, rotating prism 4 (which by way of example has been shown with light faces), and the objective 9; 3 and 3' are two toothed drums for producing the movement of the film I; 5, 5' and 5" are three toothed wheels which are respectively integral with the toothed drums 3, 3' and with the rotating prism 4; 6 is a pinion meshing with the toothed wheels 5' and 5"; 7 is a cam integral with the pinion 6; 8 is a lever operated by the cam 7 whose fulcrum 8" is slidable in a longitudinal slot 8' cut in said lever. The fulcrum or pivot 8" is integral with a sleeve 42 which is slidable on a spindle 41 fixed to the casing of the projector, the sleeve 42 being fixed to the point for its proper operation by means of the screw button 43. One end of the lever 8 is pressed against the cam 7 by the spring 24; 9 is the objective which is movable in a vertical direction, parallel to itself, and guided by the guide 10; 11 is a loosely mounted roller, named "measuring roller"; 12 is a rod movable along its axis and provided at its upper end with a fork for supporting roller 11; 13 is a cam integral with a rod 12; 14 is an helical spring tending to push upwards the rod 12, the cam 13 and the roller 11; 15 is a cylindrical lens having the axis of its cylindrical surface disposed horizontally, movable along a guide 16, and pushed toward the right by a spring 17, so that the finger 26 is constantly kept pressed against the cam 13. Lastly, 18 are guides, between which a small plate or shutter 19 may slide in a vertical direction, said small plate being provided with an opening having the same size as a photogram, the alternate movement being imparted to said small plate by a cam 20, which receives its movement from the pinion 21 which is moved in its turn with the wheel 5' meshing with it.

The correcting device is an element adapted to bring back the height of the photogram "seen" by the compensating prism, to a constant value, viz, to the value $h_t$ taken as a basis for the dimensioning of the double apothem of the base of the prism, even when it is desired to project such films, which, owing to temperature, humidity and other conditions, may have the height of the photograms differing from standard.

Said corrector comprises the adjusting cylindrical lens 15 interposed between the film and the objective, and which, as already mentioned, is movable in the direction of the axis of this latter, so as to cause it to move towards or away from the film.

The adjusting cylindrical lens 15 (which by way of example is shown divergent), the support of which is slidable on the guide 16, receives the movement from the cam 13 when, owing to the variation of the height of the photograms, the length of the film varies in correspondence to the number of photograms comprised between the two points of union of the film 1 with the drums 3, 3', this number being constant owing to the equal peripherical speed of the drums 3, 3'.

In the example shown in Fig. 1, if the height of the photograms increases, the roller 11, pushed by the spring 14 is displaced upwards; the lens 15 is consequently displaced towards the right by the cam 13 moving away from the film; and consequently the dimensions of the image of the photogram as given by the lens 15, will be reduced as compared to the real images, and will be brought back to the selected value, on condition however that the number of the photograms comprised between the two drums 3 and 3' and the shape of the cam 13, are correctly selected in relation to the focal length of the correcting or adjusting lens 15.

The respective positions of the photograms and of the faces of the prism in two characteristic phases of the projection are shown in Figs. 2 and 3, the first of which refers to a photogram centered in relation to the axis of the objective, the faces of the prism being normally disposed with respect to said axis, while in Fig. 3 the axis of the objective is shown intersecting the line of separation between two photograms and two opposite edges of the prism.

As it is known, such an arrangement allows, by suitably dimensioning the prism in relation to the number of its faces, the refracting index of the glass with which is formed, and to the standard height $h_t$ of the photogram, to obtain a first approximation of the optical compensation, as the apparent displacements of the image of the photogram "seen" through the prism vary with a non-lineal law with respect to the angles of rotation of the prism, while the actual displacements of the photogram are proportional to the angles of rotation of the prism.

On the projecting screen, this complex gives an image which is not fixed, but is oscillating, even for a small amount, with a frequency equal to that of the projection of the photograms, about a certain median position.

These oscillations are eliminated by the stabilizing device, which in accordance with the present invention is formed by the pinion 6, the cam 7, the lever 8, the spring 24, and the guides 10 of the objective 9. The pinion 6 makes a complete rotation when each photogram is projected, and consequently with the same frequency the lever 8 oscillates under the action of the cam 7, the objective 9 oscillating vertically also with the same frequency, parallel to itself.

This oscillation of the objective gives rise, on the image projected on the screen, to an oscillation similar to that due to the imperfect optical compensation produced by the prism, so that by suitably adapting the movement of the objective to the proper law, phase and amplitude, such movement may cause the oscillation of the image to be neutralized, thus producing the stabilization of the photogram on the screen.

The apparatus comprises preferably a shutter device adapted to exclude the projection on the screen of the photogram, when the center of this latter is outside of the field.

The shutter is constructed so as not to produce on the screen alternative phases of light and shade, but only the instantaneous and non-perceptible exchange of the image of a photogram with that of the following one.

During the projection, the edges of the window shutter, follow those of the photogram, and consequently the image on the screen becomes stably and sharply delimitated in a dark field.

In Fig. 1, by way of example, a type of alternative shutter is shown, cooperating with a cam 20, moved by the pinion 21; 19 is the small plate, provided with the window, slidable on the guides 18, and provided with an helicoidal spring, which, for simplicity, is not shown.

In Fig. 1 is also shown an economiser device as above described formed by a light mirror 22 applied on the small plate 19 of the shutter, at an angle of 45°, which returns towards the objective the light rays of the lamp, coming from above as they are reflected from another fixed mirror 23.

Figures 4 and 5 show two different realizations of improved forms of the correcting device with cylindrical lens of the type above described.

The image of the photogram is seen from the objective through the prism, which latter is equivalent to a thick plate having plane parallel faces, periodically inclining at a variation with respect to the axis of the objective. This variation of incidence of the light rays gives rise to an abberation, which causes the elongation of the image in the vertical direction as seen from the objective, with respect to the real photogram, said elongation being greater with an increase in the inclination of the faces of the prism with respect to the optical axis; the height $h_t$ of the photogram, consequently, varies periodically, and without special provisions, the projected image is steady only in its central portion and vibrates in the upper and lower zones.

This inconvenience may be eliminated without introducing into the system other optical elements in addition to the correcting lens 15 above described, and having recourse only to its action. In fact, both the accidental variations of the height of the photograms and the periodical variations of the heights of the virtual images caused by the prism are similiar in their effects and may be corrected simultaneously.

In Fig. 4, the correcting lens 15, shown movable in the guide 16, is controlled by a lever 32—33, the arm 33 of which is in contact with a cam 35 operated by a pinion 36 meshing with a toothed wheel 5" so as to make a complete revolution for each photogram projected. The lever 32—33 oscillates with the same frequency as the projection of the photograms, so that the distance of the lens 15 from the moving film varies with the same law and frequency. By suitably designing the cam 35 and the lever 32—33, it is possible to obtain the oscillation of the lens 15 such as to compensate the periodical aberration due to the rotation of the prism.

The lever 32—33 is moreover pivoted at the end of a second lever which is controlled, similarly to the finger 26 shown in Fig. 1, by the cam 13.

With any accidental variation of the height $h_t$ of the photograms, the lever 34 is caused to be displaced, thus displacing also the pivot of lens 15, so that the movement of this latter will correspond to the algebraic sum of the two aforesaid movements, the accidental one being transmitted through the cam 13, and the second or periodical movement is transmitted by the cam 35, this latter movement being adapted to correct the periodic aberrations produced by the rotating prism.

In Fig. 5 is shown an alternative arrangement for obtaining the same results with other mechanical means. This figure shows a box 37 slidable on slides 38, and provided with a retracting spring 40. The box 37 carries the objective 9, adapted to be vertically oscillated in the same manner and with similar means as those shown in Fig. 1. Said box 37 is caused to be oscillated accidentally from left to right and vice versa by the action of the cam 13, as previously described. The correcting lens 15 is mounted on a fixed support, and is oscillating periodically under the action of the cam 35 adjusted so as to make a complete rotation for each photogram projected. The relative movement of the lens 15 with respect to the film 1, is identical with that previously shown and described in Fig. 4, however, in the modification shown in Fig. 5, the device comprising the roller 11, the rod 12 and the cam 13, is not subjected to the inertia of matter subjected to rapid alternative movement, as is the case in the construction shown in Fig. 4, and consequently any vibration that may be transmitted to the film may be prevented by giving to the cam 13 such an inclination that it will cause a non-invertible movement.

The lens 15, which has been shown divergent in the various figures, may also be convergent; in any case it must be cylindrical and not spherical for obvious reasons.

It will also be understood that each of the elements above described, or two or more together, may also find a useful application in other types of projectors with optical compensation differing from the one above described.

I claim:

1. An optical compensating device for a cinematographic projector wherein a film moves continuously with a uniform speed, said device comprising a rotary compensating prism, a movable cylindrical lens interposed between the film and said prism, a movable rod, a roller carried by one end of said rod, a loop of the film passing over and engaging said roller, said loop having a predetermined number of photograms, a cam carried by the other end of said rod, means connected with said lens for moving it in the direction of the optical axis of the projector, said cam engaging said means, and resilient means engaging said rod, a variation in the size of said loop moving said rod and causing it to actuate said cam and the first-mentioned means to vary the distance between said lens and the film, whereby the actual height of the photogram on the screen is varied depending upon a variation in the size of said loop.

2. An optical compensating device for a cinematographic projector wherein a film moves continuously with a uniform speed, said device comprising a rotary compensating prism, a shaft carrying said prism, a gear wheel carried by said shaft, said prism rotating along with said shaft and said gear wheel, a movable cylindrical lens situated upon one side of said prism and interposed between the film and said prism, a movable rod, a roller carried by one end of said rod, a loop of the film passing over and engaging said roller, said loop having a predetermined number of photograms, a cam carried by the other end of said rod, means connected with said lens for moving it in the direction of the optical axis of the projector, said cam engaging said means, resilient means engaging said rod, a variation in the size of said loop moving said rod and causing it to actuate said cam and the first-mentioned means to vary the distance between said lens and the film, whereby the actual height of the photogram on the screen is varied depending upon a variation in the size of said loop, an objective lens situated upon the opposite side of said prism, a movable objective casing carrying said objective lens, a shank connected with said objective casing and movable therewith, a guide engaging said shank, a lever having one end engaging said shank, another cam engaging the other end of said lever, a shaft carrying the last-mentioned cam and rotatable therewith, and a pinion rotatable along with the last-mentioned shaft and meshing with said gear wheel, the gear ratio of said gear wheel and said pinion being such that the last-mentioned cam makes a complete revolution when a photogram of the film passes in front of said objective lens, the last-mentioned cam and said lever causing synchronous and parallel oscillation of the objective lens.

3. An optical compensating device for a cinematographic projector wherein a film moves continuously with a uniform speed, said device comprising a rotary compensating prism, a shaft carrying said prism, a gear wheel carried by said shaft, said prism rotating along with said shaft and said gear wheel, a movable cylindrical lens interposed between the film and said prism, a movable rod, a roller carried by one end of said rod, a loop of the film passing over and engaging said roller, said loop having a predetermined number of photograms, a cam carried by the other end of said rod, means connected with said lens for moving it in the direction of the optical axis of the projector, said cam engaging said means, resilient means engaging said rod, a variation in the size of said loop moving said rod and causing it to actuate said cam and the first-mentioned means to impart a slow and accidental movement to said lens, thereby varying the distance between said lens and the film, another gear wheel meshing with the first-mentioned gear wheel, a cam carried by the last-mentioned gear wheel and completing one revolution when a single photogram is projected, a lever having one end in operative engagement with the last-mentioned cam, means connecting said lever with the first-mentioned means, whereby a second rapid and periodic movement is imparted to said lens by the last-mentioned cam, another lever having an end adapted to be operatively engaged by the first-mentioned cam, and means constituting the fulcrum of the first-mentioned lever and pivotally connecting the first-mentioned lever with the other end of the last-mentioned lever, so that the movements of said lens compensate simultaneously both the variations in the actual heights of the photograms and the variations in the apparent heights of the photograms as viewed through the prism.

4. An optical compensating device for a cinematographic projector wherein a film moves continuously with a uniform speed, said device comprising a rotary compensating prism, having an even number of faces, a shaft carrying said prism, a gear wheel carried by said shaft, said prism rotating along with said shaft and said gear wheel, in synchronism with the unfolding of the film, a pinion meshing with said gear wheel, a cam rotatable along with said pinion and connected therewith, said cam making a complete revolution when a single photogram is projected, a lens, means connecting said lens with said cam for imparting to said lens a rapid and periodical movement in the direction of the optical axis of the projector, a slidable box, an objective lens mounted in said box, a rod, a roller carried by said rod, resilient means for tensioning said rod, a loop of film comprising a predetermined number of photograms passing over said roller, a variation in the size of said loop moving said rod, and means carried by said rod and causing said box to slide in the direction of the optical axis of the projector when said rod is moved, the movement of said box varying the distance between the film and the last-mentioned lens, so as to compensate and correct the apparent height of the photograms viewed from the last-mentioned lens through said prism.

5. An optical compensating device for a cinematographic projector wherein a film moves continuously with a uniform speed, said device comprising a rotary compensating prism, a shutter, a mirror integral with said shutter for reflecting a beam of light through an opening formed in said shutter toward the film, means connected with the rotary compensating prism and said shutter for reciprocating the shutter at the rate of one reciprocation during the projection of one photogram and causing the mirror to follow the movement of a photogram in the course of projection so as to project the beam of light thereon, and another mirror projecting light upon the first-mentioned mirror.

PIETRO PARVOPASSU.